United States Patent [19]

Moore et al.

[11] Patent Number: 5,199,317

[45] Date of Patent: Apr. 6, 1993

[54] FORWARD AND REVERSE POWER SHIFT TRANSMISSION

[75] Inventors: Keith O. Moore, N. Dartmouth, Mass.; Robert Wessel, Greenwood, Ind.; Bruce M. Roberts, New Bedford, Mass.

[73] Assignee: Borg-Werner Automotive Transmission & Engine Components Corporation, Sterling Heights, Mich.

[21] Appl. No.: 902,113

[22] Filed: Jun. 22, 1992

[51] Int. Cl.$^5$ ............................................. F16H 3/14
[52] U.S. Cl. ........................................ 74/361; 184/1.5; 184/6-12; 188/77 R; 192/113 B
[58] Field of Search ........ 74/361; 192/85 AA, 113 B; 188/77 R; 184/1-5, 6-12, 6.24

[56] References Cited

U.S. PATENT DOCUMENTS

| | | | |
|---|---|---|---|
| 2,901,923 | 9/1959 | Waclawek | 74/688 |
| 2,973,845 | 3/1961 | Sinclair | 74/361 X |
| 3,099,166 | 7/1963 | Schon | 192/85 A A |
| 3,184,006 | 5/1965 | Fox | 188/77 R |
| 4,138,006 | 2/1979 | Benson, Jr. | 74/361 X |

OTHER PUBLICATIONS

Series 5000 Marine Transmission by Borg-Warner dated Nov. 1990.

*Primary Examiner*—Dirk Wright
*Attorney, Agent, or Firm*—Reising, Ethington, Barnard

[57] ABSTRACT

A forward and reverse power shift transmission (10) with an enclosed gear case (38) and a torque converter housing (44) is adapted to be connected to an engine bell housing (12). An input shaft (46), a lay shaft (146) an output shaft 36 and a pump driveshaft (280) are rotatably journaled in the gear case. A clutch cylinder and gear (78) secured to the input shaft is in mesh with a clutch cylinder and gear (178) secured to the lay shaft 146. A clutch gear (100) rotatably mounted on the input shaft (46) and a clutch gear (200) rotatably mounted on the lay shaft (146) are both in mesh with an output gear 240 on the output shaft 36 and in the front portion of the gear case (38). A pump drive gear (248) is journaled on the input shaft (46) and is adapted to be driven by the torque converter housing (262). The pump drive gear (248) is in mesh with a driven pump gear (290) on the pump drive shaft. The pump drive shaft (280) drives a lubrication pump (291) and is also a power take off. The input shaft (46) and the lay shaft (146) carry multiple disk clutches that lock the clutch gears (100 or 200) to the input or lay shafts when engaged. Switches (484) provide a warning when the clutch disk assemblies (112 or 212) and the clutch dics (114 or 214) are worn. A catch basin (334) on the outside of the gear case (38) catches any lubricant that is released while removing the external filter (326). A brake and assembly (336) encircles the output shaft 36; inside the gear case and brakes the output shaft when engaged.

23 Claims, 8 Drawing Sheets

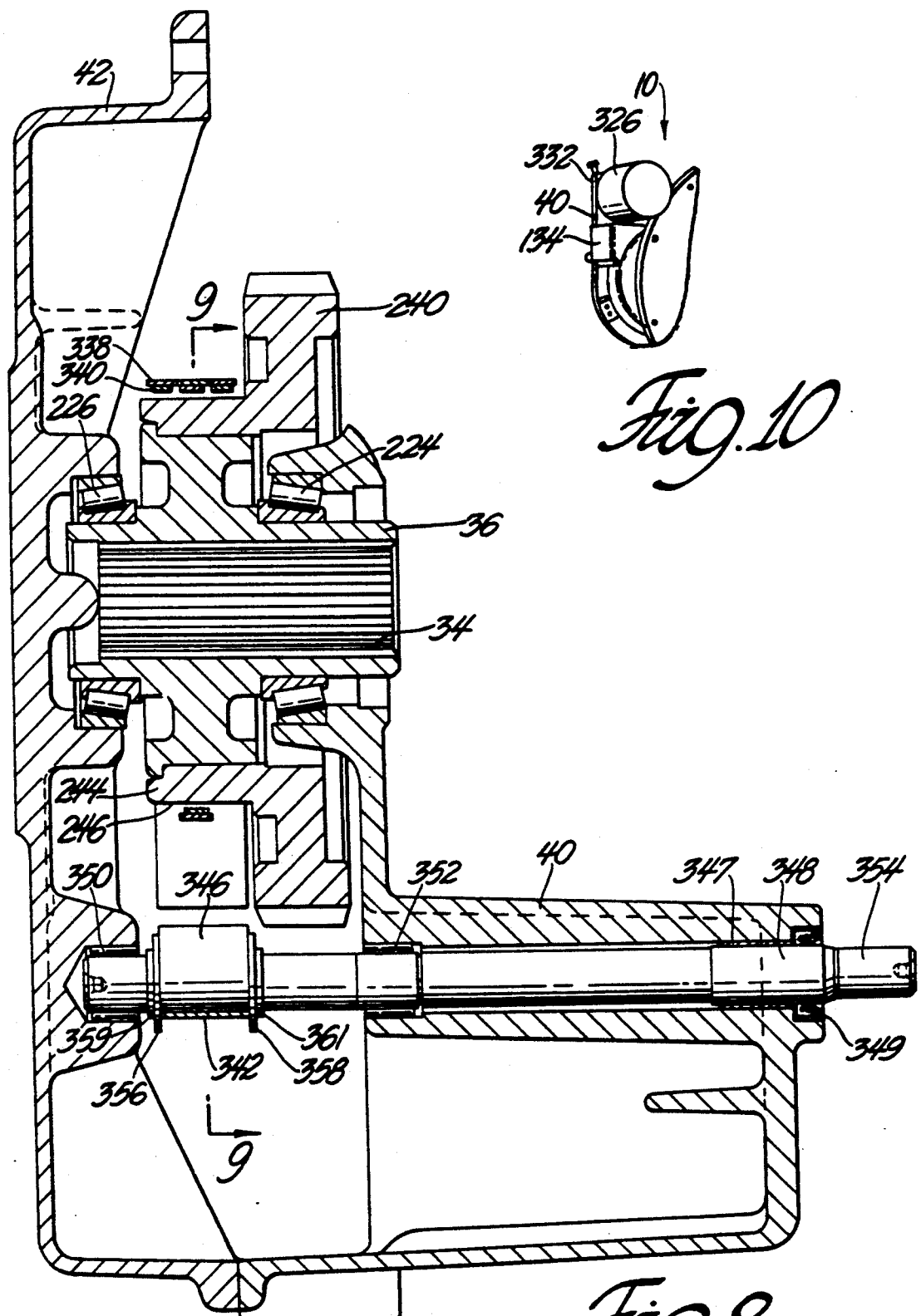

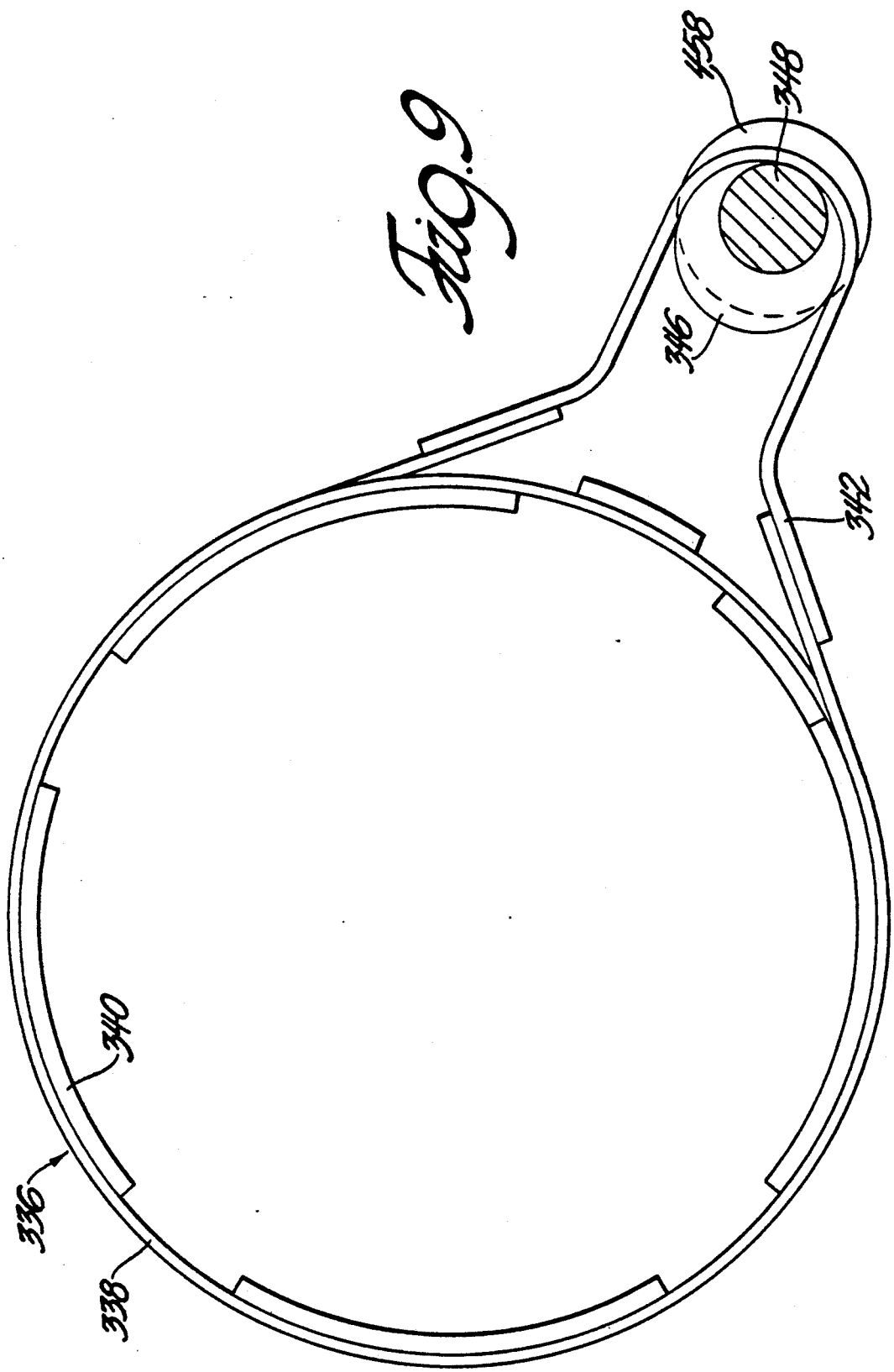

FORWARD AND REVERSE POWER SHIFT TRANSMISSION

TECHNICAL FIELD

The invention relates to a vehicle transmission. The transmission has a forward gear ratio and a reverse gear ratio and is particularly usefull in industrial vehicles such as lift trucks.

BACKGROUND OF THE INVENTION

Lift trucks and other industrial vehicles have various drive train arrangements. These drive train arrangements generally include an internal combustion engine, a torque converter, a transmission, a driveshaft, and a drive axle. In some industrial vehicles the transmission, driveshaft, and drive axle are combined into a trans axle. The internal combustion engine and torque converter are usually attached directly to the trans axle. Industrial vehicles without trans axles frequently have drive trains with the internal combustion engine, the transmission, and the axle rigidly attached to each other. Because industrial vehicles such as lift trucks have the drive axle attached rigidly to the frame, both of the above drive train arrangements result in a rigid connection between the engine and the vehicle frame.

A rigid connection between an internal combustion engine in a vehicle frame transfers engine vibrations and noise directly to the frame. Such vibrations in the frame reduce operator comfort and can cause metal fatigue and other problems. Attempts to improve operator comfort by providing enclosed cabs mounted on the vehicle frame by rubber isolation mounts have had limited success. The various controls that are required on industrial vehicles tend to transfer vibration and noise into the enclosed cab. Controls which do not transfer noise and vibration are expensive to manufacture and may not provide the required reliability. Cabs are not used on many industrial vehicles for various reasons. Vibration and noise at the operator's station on vehicles without cabs cause operator discomfort.

Isolation mounting of internal combustion engines reduces noise and vehicle vibration, improves operator comfort, whether the operator is in an enclosed cab or not. Drive trains with isolation mounted engines that have the torque converter and transmission rigidly connected to the engine and employ a driveshaft with universal joints to transfer torque from the transmission to the drive axle are employed in passenger vehicles and highway trucks. The driveshafts in passenger vehicles and highway trucks are generally several feet long. Many industrial vehicles cannot use a long driveshaft with universal joints because it would require an increase in vehicle length. An increase in the length of a lift truck for example, will reduce maneuverability and may make the lift truck unusable in some buildings and in some storage areas. Driveshafts can be shortened to a limited extent. The shorter a driveshaft is, the greater the angular changes to be accommodated by the universal joints. A small increase in the angle at which universal joints operate can result in a substantial decrease in universal joint life.

SUMMARY OF THE INVENTION

An object of the invention is to provide a torque converter and transmission assembly that is very short and when connected to an isolation mounted internal combustion engine, will allow torque to be transmitted from the transmission directly to a vehicle drive axle by universal joints and a driveshaft of adequate length while maintaining a compact, complete drive train package.

Another object of the invention is to provide a transmission with a lubrication fluid pump that has a drive axis offset to one side of the transmission input shaft.

A further object of the invention is to provide a transmission with a power takeoff.

A still futher object of the invention is to provide a transmission with a multiple disk clutch wear indicator to eliminate unnecessary maintenance.

An additional object of the invention is to provide a transmission with a clutch modulator that can be serviced without dissassembly of other parts of the transmission.

A further additional object of the invention is to proivde a transmission with a multiple disk clutch with an internal band-type brake.

A still further additional object of the invention is to provide a transmission with an external lubrication filter and an external catch basin to catch lubricant that is released during filter removal.

The transmission includes an enclosed gear case and a torque converter housing adapted to be attached to an internal combustion engine bell housing. An input shaft is rotatably journalled in the gear case and is driven by a torque converter in the torque converter housing. A lay shaft is rotatably journalled in the gear case to one side of the input shaft. An output shaft is rotatably journalled in the gear case below the input shaft.

A clutch cylinder and gear is secured to the rear portion of the input shaft and rotates with the input shaft. A lay clutch cylinder and gear is secured to the lay shaft and is in mesh with and driven by the clutch cylinder and gear on the input shaft any time the input shaft is rotated. A clutch gear is rotatably journalled on the input shaft adjacent to the front wall of the gear case. A lay clutch gear is rotatably journalled on the lay shaft adjacent to the front wall of the gear case. An output gear is secured to the output shaft and is in mesh with the clutch gear on the input shaft and the lay clutch gear on the lay shaft.

A multiple disk clutch on the input shaft locks the clutch gear to the input shaft when the clutch is engaged and lets the clutch gear rotate relative to the input shaft when the clutch is disengaged. A multiple disk lay clutch on the lay shaft locks the lay clutch gear to the lay shaft when the lay clutch is engaged and lets the lay clutch gear rotate relative to the lay shaft when the lay clutch is disengaged.

A stator support with a central bore is secured to the front wall of the gear case main casing cover inside main casing cover and the torque converter housing. The input shaft extends through a central bore in the stator support. A pump drive gear is rotatably supported on the stator support.

A torque converter assembly slides over the forward end of the input shaft with a splined hub on the stator in engagement with a splined section of the stator support. A pump drive support secured to the pump drive gear has a splined section which engages a splined bore in the torque converter assembly and drives the pump drive gear any time the torque converter assembly is driven. A turbine in the torque converter assembly has a splined hub that slides over the splined end of the input shaft and drives the input shaft. The torque converter assembly also has an impeller that is secured to the torque converter casing.

A lubrication pump driveshaft is rotatably journalled in the gear case. A lubrication pump driven gear is secured to the lubrication pump driveshaft and is in mesh with the lubrication pump drive gear. The lubrication pump is secured in a recess in the gear case and is in engagement with the lubrication pump driveshaft. The pump driveshaft has a splined bore which serves as a power takeoff to drive accessories, such as a hydraulic pump for operating hydraulic actuators.

The multiple disk clutches or the input shaft and on the lay shaft each include an annular hydraulic piston. When a clutch is engaged the clutch piston axially clamps clutch disk assemblies and clutch disks together to prevent rotation between the input or lay shaft and the clutch gear or lay clutch gear. The annular hydraulic pistons are activated by fluid under pressure to engage the multiple disk clutches. When hudraulic fluid under pressure is directed to one of the multiple disk clutches by a valve assembly it is also directed to a cylinder and piston accumulator. Full clamping force is not obtained until the accumulator piston has reached an end of the cylinder and the accumulator is full of lubricant. The accumulator cylinder is a bore in the outside of the transmission gear case main casing. Removal of an accumulator cover provides full access to the accumulator cylinder and the accumulator piston for service.

The clutch disk assemblies and the clutch disks wear over a period of use and become thinner. As the clutch disk assemblies and the clutch disks become thinner, the distance the clutch pistons travel to engage the clutches increases. When the clutch disks become too worn, the annular clutch piston seals move past a port which allows fluid under pressure to activate a switch that tells the operator that the clutch disk assemblies and the clutch disks should be replaced.

A lubrication fluid filter seals against a generally vertical surface on the gear case. This places the filter cartridge in a horizontal position and allows fluid to drain out of the filter when the lubrication pump is not running. Some of the lubricant remains in the filter and may drain from the filter during filter replacement. A lubricant catch basin is provided below the filter on the outside of the gear case to catch and retain any lubricant that is spilled. The lubricant in the catch basin can be absorbed by an absorbant material and disposed of prio to installation of a new filter. It is important to catch lubricant and prevent spills when a lift truck or other industrial vehicle is used and serviced in areas where food products are processed.

The output shaft carries an output gear which meshes with a clutch gear on the input shaft and the lay clutch gear on the lay shaft. When the multiple disk clutch on the input shaft is engaged, the input shaft rotates in one direction and the output shaft is rotated in the other direction. When the multiple disk clutch on the lay shaft is engaged, the output shaft is rotated in the same direction as the input shaft. Only one of the multiple disk clutches is engaged at a given time. One of the multiple disk clutches is always disengaged.

A brake band assembly has a band that is wrapped around a cylindrical surface on the output grar. The ends of the band are secured to a yoke member. The yoke member receives an eccentric cam on a brake actuator shaft that is journalled in the gear case. Rotation of the brake actuator shaft either moves the yoke member away from the output shaft to tighten the band on the cylindrical surface and hold the output gear and output shaft from turning, or moves the yoke member toward the output shaft to loosen the band on the cylindrical surface and allow the output gear and ouput shaft to turn. A splined bore in the output shaft receives a splined shaft on one end of a driveshaft. The driveshaft transmits torque to a drive axle when one of the multiple disk clutches is engaged and prevents rotation of the drive axle when the brake is applied.

Further objects, features, and other aspects of this invention will be understood from the following detailed description of a preferred embodiment thereof as illustrated in the accompanying drawings.

DESCRIPTION OF THE DRAWINGS

FIG. 8 is an enlarged sectional view of the output shaft and the parking brake;

FIG. 9 is an enlarged end view of the brake band and the actuator cam taken along line 9—9 in FIG. 8; and FIG. 10 is a view of the lubricant filter mounted on the gear case and the catch basin that retains lubricant that is released when the filter is removed.

DESCRIPTION OF THE PREFERRED EMBODIMENT

Figure 1:
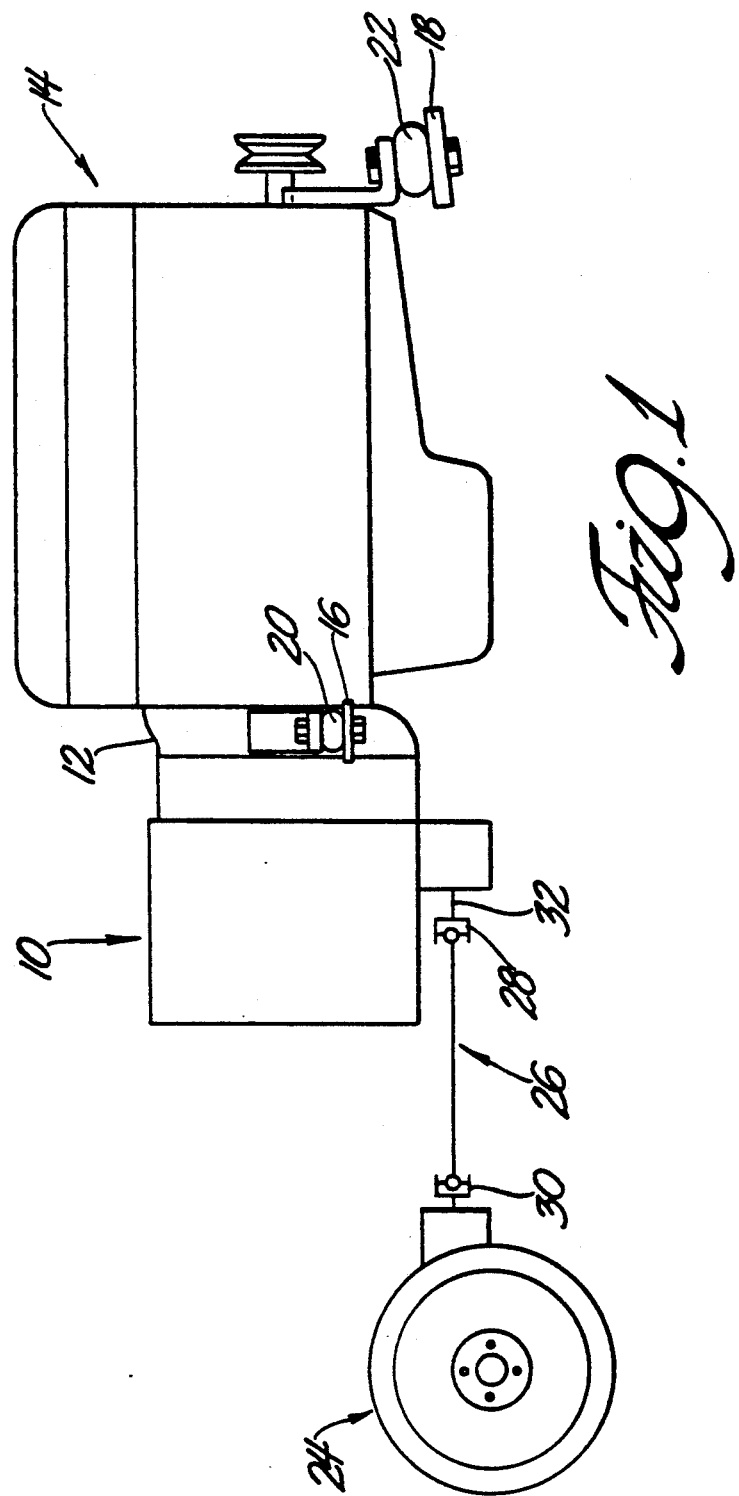
FIG. 1 is a schematic, side elevation of a drive train with an isolated mounted internal combustion engine and transmission, a driveshaft and a drive axle.
Figure 2:
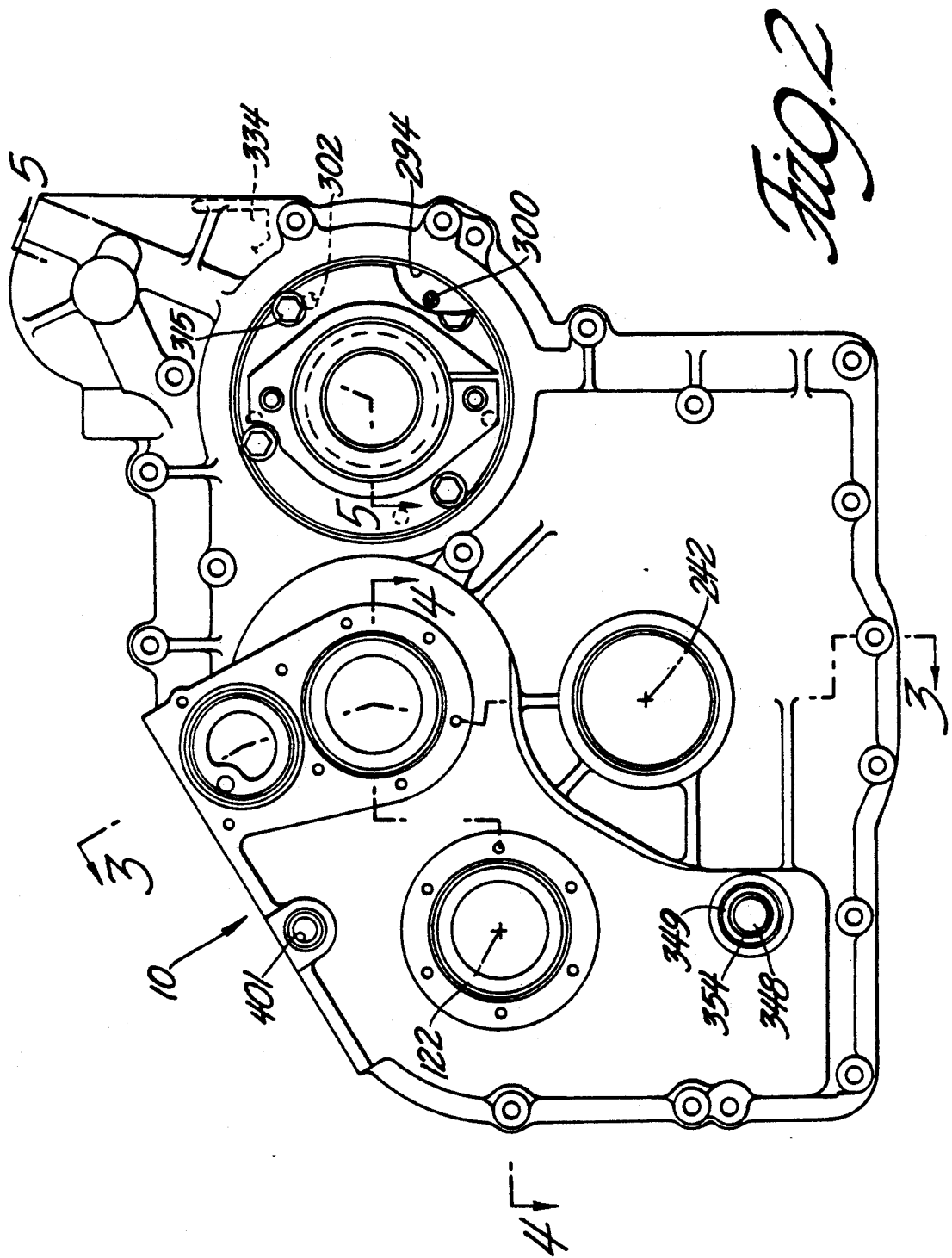
FIG. 2 is a rear elevational view of the gear case main casing with some parts broken away and other parts removed.
Figure 3:
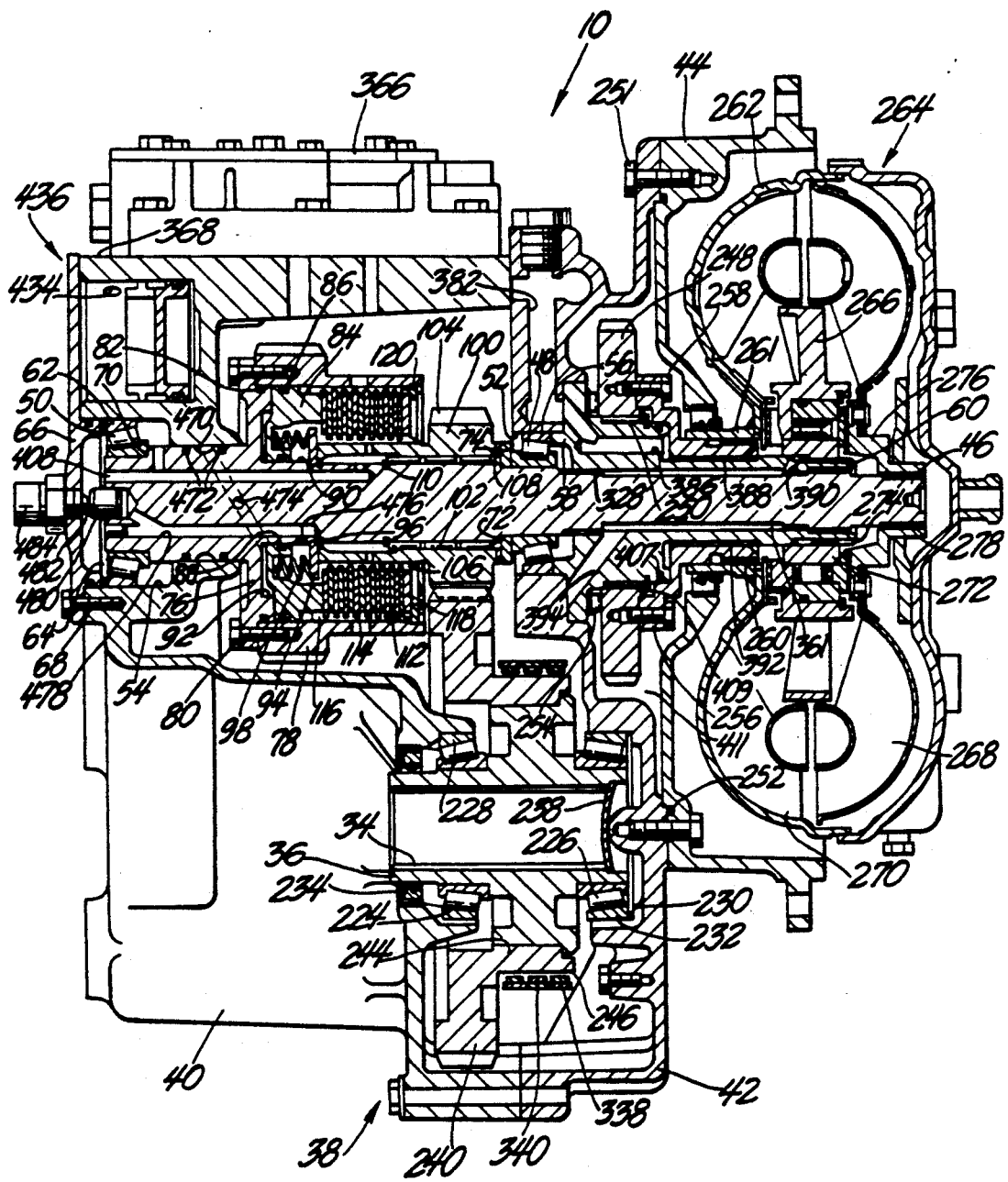
FIG. 3 is a cross sectional view taken along line 3—3 in FIG. 2.
Figure 4:
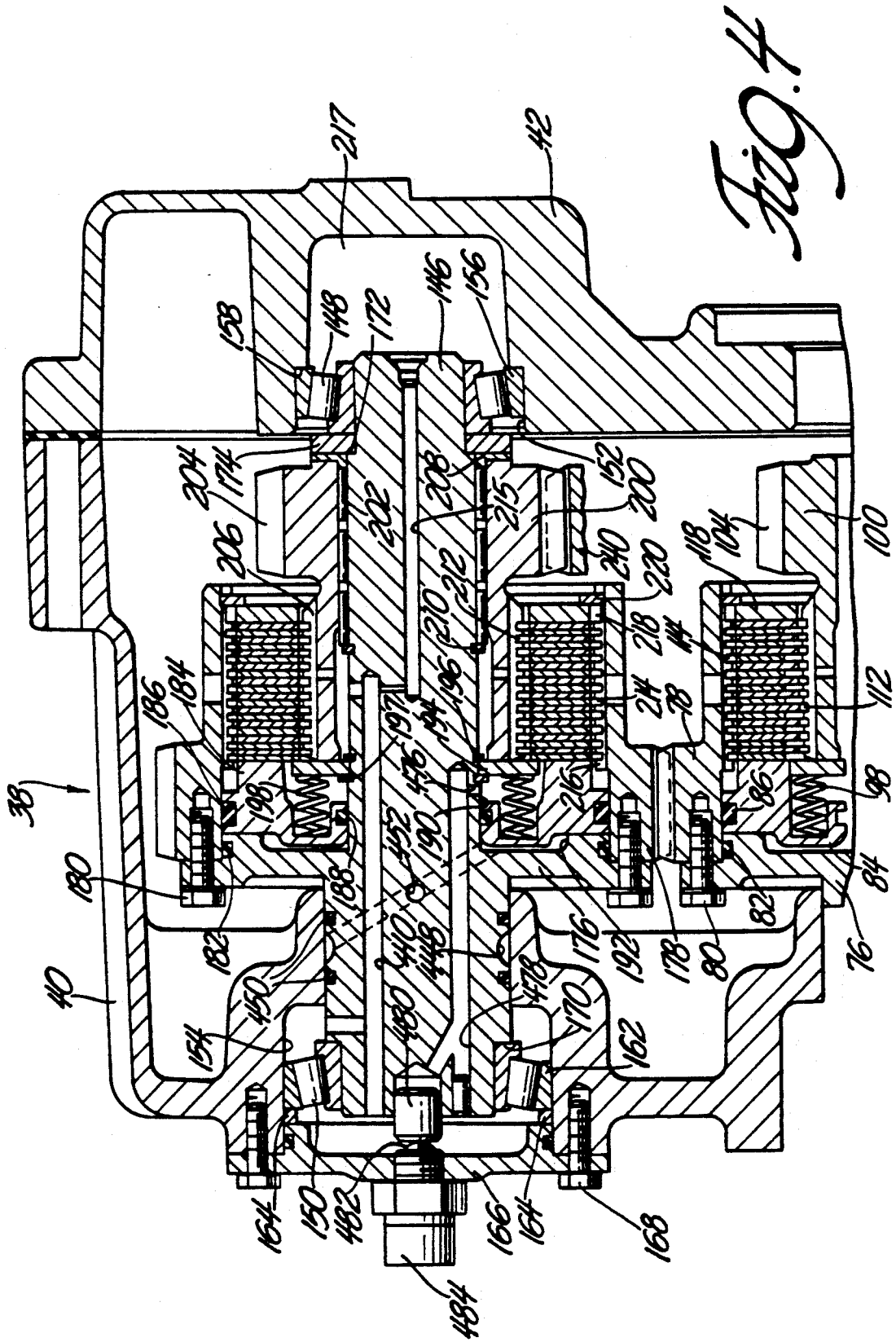
FIG. 4 is an enlarged cross sectional view of the lay shaft and the adjacent parts taken along line 4—4 in FIG. 2.
Figure 5:
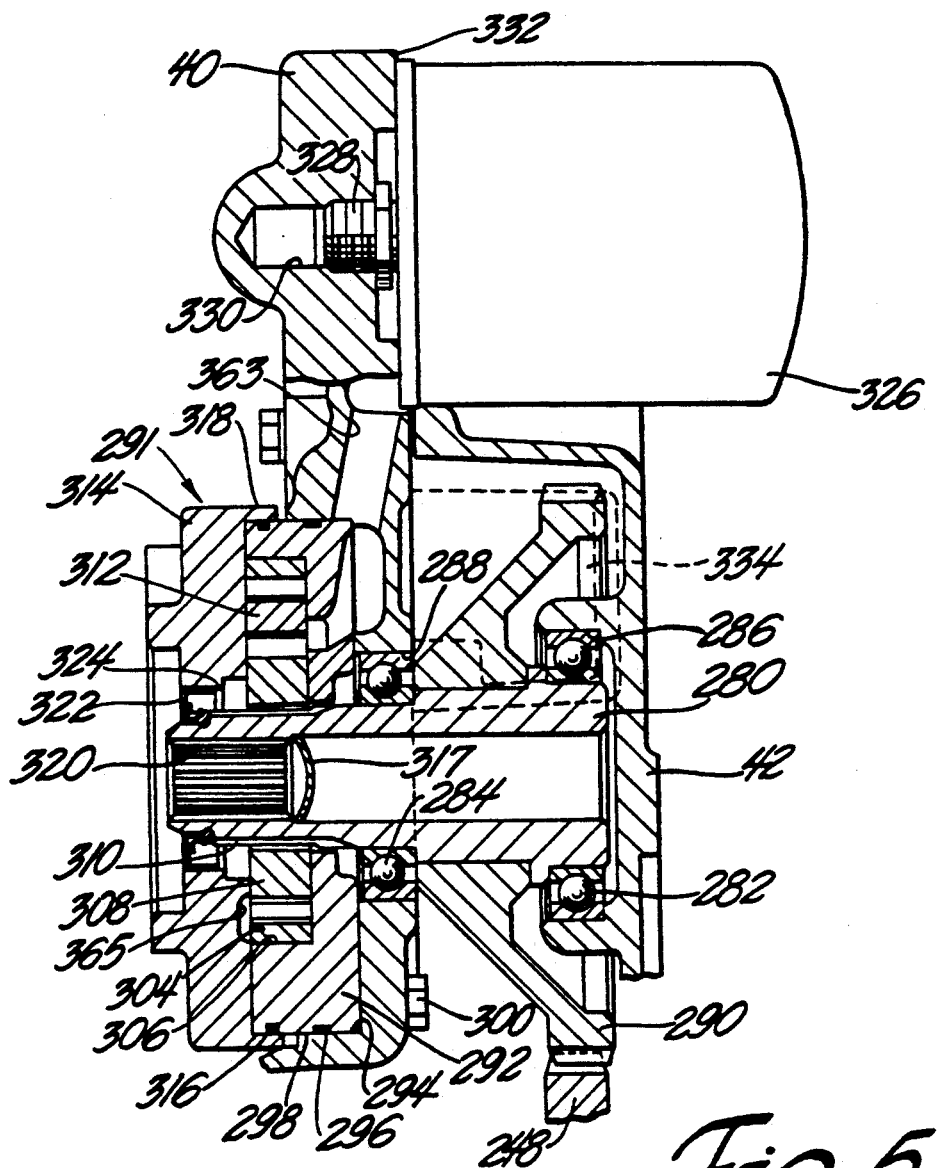
FIG. 5 is an enlarged cross sectional view of the lubrication pump, the lubrication pump drive, and the power takeoff taken along line 5—5 in FIG. 2.

The forward and reverse power shift transmission 10 is shown in FIG. 1 attached to the bell housing 12 of an internal combustion engine 14. The internal combustion engine 14 is supported on a vehicle frame member 16 on each side of the internal combustion engine and a vehicle frame member 18 by rubber isolation mounts 20 and 22. Torque is transmitted from the transmission 10 to a drive axle 24 by a driveshaft 26. The driveshaft includes a front universal joint 28 and a rear universal joint 30. The front universal joint 28 is connected to the transmission 10 by a splined shaft 32 that slides into the splined central bore 34 in the output shaft 36.

In the following description the term "forward" will mean "toward the internal combustion engine 14" and the term "rear" will mean "toward the drive axle 24." However, it should be recognized that these terms are used for convenience and have no bearing on how the transmission 10 is mounted in an actual vehicle. The internal combustion engine 14 and the transmission 10 can be turned around 180° can be transversely mounted, or can be mounted at some other angle relative to the direction of travel if desired.

The transmission 10 includes a gear case 38 with a main casing 40 and a main casing cover 42. A torque converter housing 44 is bolted to the front side of the main casing cover 42 and is adapted to be attached to the bell housing 12 of an internal combustion engine 14. The gear case 38 is rigidly attached to the internal combustion engine 14 and moves with the engine when the rubber isolation mounts allow movement of the engine relative to the vehicle frame members 16 and 18.

An input shaft 46 is mounted in the gear case 38 by a front tapered roller bearing 48 and a rear tapered roller bearing 50. The front tapered roller bearing 48 is mounted in a bore 52 in the main casing cover 42. The rear tapered roller bearing 50 is mounted in a bore 54 in the main casing 40. The input shaft has a axis of rotation which is the same as the axis of rotation of the crankshaft of the internal combustion engine 14. The front tapered roller bearing 48 has a cup 56 that abuts against a flange 58 of a stator support 60 that is bolted to the main casing cover 42. The cup 62 of the rear tapered roller bearing 50 is axially positioned by shims 64 and the shaft and accumulator cover 66 that is held in place by bolts 68. The input shaft 46 is axially positioned in the rear tapered roller bearing 50 by an abutment surface 70 and in the front tapered roller bearing 48 by an abutment surface 72 and a spacer 74. The required axially preload on the front and rear tapered roller bearings 48 and 50 is set by using shims 64 with the proper axial thickness.

The input shaft 46 has an integral flange 76. A clutch cylinder and gear 78 is secured to the integral flange 76 on the input shaft 46 by bolts 80. A seal 82 between the integral flange 76 and the clutch cylinder and gear 78 seals the cylinder. An annular piston 84 is positioned in the cylinder portion of the clutch cylinder and gear 78. A seal 86 carried by the annular piston 84 seals between the outer surface of the annular piston and the inside surface of the clutch cylinder and gear 78. A seal 88 carried by the annular piston 84 seals between the inner surface of the annular piston and the surface 90 of the input shaft 46. The annular piston 84 and the seals 86 and 88 cooperate with the input shaft 46 and the clutch cylinder and gear 78 to form a hydraulic fluid chamber 92. An annular retainer plate 94 is held on the input shaft 46 by a snap ring 96 and retains return springs 98. The return springs 98 bias the annular piston 84 toward the integral flange 76. A clutch gear 100 is rotatably journalled on the input shaft 46 by a needle bearing 102. The clutch gear 100 has gear teeth 104 positioned adjacent the main casing cover 42 which forms the front wall of the gear case 38 and a splined section 106 which extends rearwardly into the clutch cylinder and gear 78. The clutch gear 100 is axially positioned on the input shaft 46 between a thrust washer 108 and a snap ring 110. The central teeth of ten clutch disk assemblies 112 engage the splined section 106 of the clutch gear 100 and rotate with the clutch gear. A clutch disk 114 with outer teeth is positioned between each pair of clutch disk assemblies 112 and between the annular piston 84 and one of the clutch disk assemblies. The outer teeth of the clutch disks 114 engage internal splines 116 in the clutch cylinder and gear 78 to ensure that the clutch disks rotate with the input shaft 46. A clutch backing disk 118 with teeth that engage the internal splines 116 is retained in the clutch cylinder and gear 78 by a snap ring 120. When hydraulic fluid is forced into the hydraulic chamber 92 the annular piston 84 moves toward the clutch backing disk 118 compresses the return springs 98 and squeezes the clutch disk assemblies 112 and the clutch disks 114 between the annular piston and the clutch backing disk 118. When the annular piston 84 applies sufficient force rotation between the clutch disk assemblies 112 and the clutch disks 114 will stop and the clutch gear 100 will be locked to the input shaft 46. The release of hydraulic fluid from the hydraulic chamber 92 allows the return springs 98 to move the annular piston 84 away from the clutch backing disk 118, thereby releasing the force squeezing the clutch disk assemblies 112 and the clutch disks 114 together. When sufficient force is released, the clutch disk assemblies 112 can rotate relative to the clutch disks 114 and the clutch gear 100 can rotate relative to the input shaft 46.

A lay shaft 146 is rotatably journalled in the gear case 38 by a front tapered roller bearing 148 and a rear tapered roller bearing 150. The front tapered roller bearing 148 is mounted in a bore 152 in the main casing cover 42. The rear tapered roller bearing 150 is mounted in a bore 154 in the main casing 40. The lay shaft 146 has an axis of rotation 122 which is to one side and below the input shaft 46. The front tapered roller bearing 148 has a cup 156 that abuts against a surface 158 in the bore 152. The cup 162 of the rear tapered roller bearing 150 is axially positioned by shims 164 and the shaft cover 166 that is held in place by bolts 168. The lay shaft 146 is axially positioned in the rear tapered roller bearing 150 by an abutment surface 170 and in the front tapered roller bearing 148 by an abutment surface 172 and a spacer 174. The required axial preload on the front and rear tapered roller bearings 148 and 150 is set by using shims 164 with a proper axial thickness.

The lay shaft 146 has an integral flange 176. A clutch cylinder and gear 178 is secured to the integral flange 76 on the lay shaft 146 by bolts 180. A seal 182 between the integral flange 176 and the clutch cylinder and gear 78 seals the cylinder. An annular piston 184 is positioned in the clutch cylinder and gear 178. A seal 186 carried by the annular piston 184 seals between the outer surface of the annular piston and the inside surface of the clutch cylinder and gear 178. A seal 188 carried by the annular piston 184 seals between the inner surface of the annular piston and the surface 190 on the lay shaft 146. The annular piston 184 and the seals 186 and 188 cooperate with the lay shaft 146 and the clutch cylinder and gear 178 to form a hydraulic fluid chamber 192. An annular retainer plate 194 is positioned on the lay shaft 146 by snap rings 196 and 197. The return springs 198 bias the annular piston 184 toward the integral flange 176. A lay clutch gear 200 is rotatably journalled on the lay shaft 146 by needle bearing 202. The clutch gear 200 has gear teeth 204 positioned adjacent to the main casing cover 42 which forms the front wall of the gear case 38 and a splined section 206 which extends rearwardly into the clutch cylinder and gear 178. The clutch gear 200 is axially positioned on the lay shaft 146 between a thrust washer 208 and a snap ring 210. The central teeth of the ten clutch disk assemblies 212 engage the splined section 206 of the clutch gear 200 and rotate with the clutch gear. A clutch disk 214 with outer teeth is positioned between each pair of clutch disk assemblies 212 and between the annular piston 184 and one of the clutch disk assemblies. The outer teeth of clutch disks 214 engage internal splines 216 in the clutch cylinder and gear 178 to ensure that the clutch disks rotate with the lay shaft 146. A clutch backing disk 218 with teeth that engage the internal splines 216 is retained in the clutch cylinder and gear 178 by a snap ring 220. When hydraulic fluid is forced into the hydraulic fluid chamber 192 the annular piston 184 moves toward the clutch backing disk 218, compresses the return springs 198 and squeezes the clutch disk assemblies 212 and the clutch disks 214 between the annular piston and the clutch backing disk 218. When the annular piston 184 applies sufficient force, rotation between the clutch disk assemblies 212 and the clutch disks 214 will stop and the clutch gear 200 will be locked to the lay shaft 146. The release of hydraulic fluid from the hydraulic fluid chamber 192 allows the return springs 198 to move the annular piston 184 away from the clutch backing disk 218 thereby releasing the force squeezing the clutch disk assemblies 212 an the clutch disks 214 together. When sufficient force is released the clutch disk assemblies 212 ca rotate relative to the clutch disks 214 and the clutch gear 200 can rotate relative to the lay shaft 146.

An output shaft 36 is rotatably journalled in the lower portion of the gear case 38 directly below the input shaft 46 by tapered roller bearings 224 and 226. The tapered roller bearing 224 is seated in the bottom of a bore 228 in the main casing 40. The tapered roller bearing 226 is positioned in a bore 230 in the main casing cover 42 during assembly. The axial preload in the tapered roller bearings 224 and 226 is obtained by forcing the cup 232 of the tapered roller bearing 226 into the bore 230 to the desired position during assembly of the transmission 10. The output shaft 36 extends rearwardly out of the gear case 38. A lip seal 234 is provided where the output shaft 222 passe out of the gear case 38 to retain lubricant in the gear case. The output shaft 222 has a splined central bore 34 which receives a splined end of a driveshaft 26. The forward end of the splined central bore 34 is closed by a plug 238 to prevent the leakage of lubricant from the gear case 38. An output gear 240 is secured to the output shaft 36 and rotates about an axis 242 that is below the input shaft 46. The output gear 240 has an axially offset section 244 that allows the tapered roller bearing 224, which supports the rear of the output shaft 36, to be moved forward to a position below the clutch gear 100 on the input shaft 46. This allows the rear end of the output shaft 36 to be moved forward thereby allowing an increase in the length of the driveshaft 26 or a reduction in the space between the transmission and a drive axle 24. The axially offset section 244 of the output gear 240 also provides a cylindrical brake band engaging surface 246.

The output gear 240 meshes with the clutch gear 100 on the input shaft 46 and the lay clutch gear 200 on the lay shaft 146. When the clutch on the input shaft 46 is engaged, the output shaft 36 rotates in a direction opposite the direction of the input shaft 46. When the clutch on the lay shaft 146 is engaged the output shaft 36 rotates in the same direction as the input shaft 46.

A pump drive gear 248 is rotatably journalled on the stator support 60 by a needle bearing 250. The pump drive gear 248 is outside the enclosed portion of the gear case 38 and in a recess in the front portion of the main casing cover 42. The pump drive gear 248 is enclosed by the torque converter housing 44 which cover the recess area when the torque converter housing is bolted to the main casing cover 42 by bolts 251 with a seal 252 in place. A needle thrust bearing 254 is mounted between the pump drive gear 248 and a flange on the stator support 60. The pump drive support 256 is bolted to the pump drive gear 248 by bolts 258. Splines 260 on a tubular portion of the pump drive support 256 engage splines in a collar 261 that is attached to the torque converter casing 262 by welding. The torque converter casing 262 of the torque converter 264 is attached directly to the crankshaft and fly wheel of an internal combustion engine 14 and rotates at the same speed as the internal combustion engine any time the internal combustion engine is running.

The torque converter 264 has a stationary stator 266, a turbine 268, and an impeller 270. The stator 266 has a hub 272 with internal splines that engage splines 274 on the stationary stator support 60. The impeller 270 includes a series of impeller blades attached to the inside of the torque converter casing 262. The turbine 268 includes a series of turbine blades attached to a hub 276 with splines that engage splines 278 on the end of the input shaft 46.

A pump drive shaft 280 is rotatably journalled in a front ball bearing 282 and a rear ball bearing 284 at one side of the input shaft 46. The front ball bearing 282 is in a bore 286 in the main casing cover 42. The rear ball bearing 284 is in a bore 288 in the main casing 40. A driven pump gear 290 is secured to the pump drive shaft 280 and passes through a window in the main casing cover 42 to mesh with the pump drive gear 248. A lubrication pump 291 including a lubrication pump housing 292 is mounted n a bore 294 in a rearward facing portion of the main casing 40. A seal 296 seals between the bore 294 and the outer surface 298 of the lubrication pump housing 292. The lubrication pump housing 292 is retained in the bore 294 by five bolts 300 which pass through bores 302 through the main casing 40. A pump gear 304 with internal gear teeth is rotatably mounted in a circular bore 306 in the lubrication pump housing 292. The axis of rotation of the pump gear 304 with internal gear teeth is offset from the axis of rotation of the pump driveshaft 280. A pump gear 308 with internal splines that engage splines 310 on the pump driveshaft 280 has external gear teeth that mesh with the internal teeth on the pump gear 304. A cresent shaped portion 312 of the lubrication pump housing 292 extends into a space between the pump gear 304 in the pump gear 308. A pump adapter 314 is secured to the lubrication pump housing 292 by bolts 315. A seal 316 is provided to seal between the outer surface of the lubrication pump housing 292 and a circular flange 318 on the pump adapter 314. An auxiliary hydraulic pump can be attached to the pump adapter 314 to provide hydraulic fluid to operater various components of an industrial vehicle. Such components could include linear actuators and rotary actuators. A drive shaft on the auxiliary hydraulic pump would engage the splines 320 in the bore in the pump driveshaft 280. A shaft seal 322 is provided to prevent the loss of lubricant between the pump driveshaft 280 and a central bore 324 through the pump adapter 314. Different pump adapters 314 can be used for different auxiliary pumps. A plug 317 is pressed into the bore through the pump drive shaft 280 to prevent loss of lubricant from gear case 38.

An oil filter 326 screws onto a threaded fitting 328. The threaded fitting 328 screws into a threaded bore 330 in the main casing 40. The lubricant filter 326 seals against a forwardly facing flat surface 332 on the main casing 40. Lubricant in the lubrication filter 326 tends to drain into the gear case 38 to the transmission 10 when the internal combustion engine is turned off. Any lubricant which is released from the filter 326 during filter replacement is caught in a catch basin 334. Any lubricant which is caught in the catch basin 334 can be absorbed by an absorbant material and removed.

A brake band assembly 336 as shown in FIG. 9, includes a steel band 338 and an attached friction material 340. The steel band 338 encircles the cylindrical brake band engaging surface 246 on the offset section 244 of the output gear 240. The ends of the steel band 338 are secured to a U-shaped yoke member 342. The yoke member 342 receives a circular eccentric cam 346 that is integral with a brake actuator shaft 348. The brake actuator shaft 348 is journalled in a needle bearing 350 in the main casing cover 42 and in a needle bearing 352 in the main casing 40. An end 354 of the brake actuator shaft 348 extends out of the gear case 38 and has splines, and key or flat areas for the attachment of a brake actuator lever.

A bushing 347 and a lip seal 349 are provided near the end 354 of the brake acutator shaft 348 that extends through the main casing 40. Pivotal movement of the brake actuator shaft 348 pivots the eccentric cam 346. Pivotal movement of the eccentric cam 346 cams the yoke member 342 away from the cylindrical brake band engaging surface 246 thereby tightening the steel band 338 around the cylindrical brake band engaging surface 246. When the steel band 338 is tightened sufficiently it will prevent rotation of the output shaft 36. Pivotal movement of the eccentric cam 346 to cause the yoke member 342 to move torward the cylindrical brake band engaging surface 246 will loosen the steel band 338 and allow the output shaft 36 to rotate. Washers 356 an 35 are positioned adjacent to the eccentric cam 346 to retain the yoke member 342 on the eccentric cam. The washers 356 and 358 are held in position on the brake actuator shaft 348 by snap rings 359 and 361.

The lubrication pump 291 lifts lubricant from the sump 360 formed by the lower portion of the gear case 38. The lubricant is lifted through passages 362 formed in the gear case 38 and delivered to the pump inlet chamber 365 in the pump adaptor 314. Lubricant is pumped from the lubrication pump 291 through passages 363 in the main casing 40. After lubricant passes through the filter 326 it passes through a passage 364 to a valve block 366 attached to a flat surface 368 on the main casing 40. The valve block 366 is a standard valve block with solenoid operated valves and a manually operated spool valve 370. Lubricant from the filter 326 is directed to a regulator valve 372 by passages 374 and 376 in the valve block 366.

Figure 6:
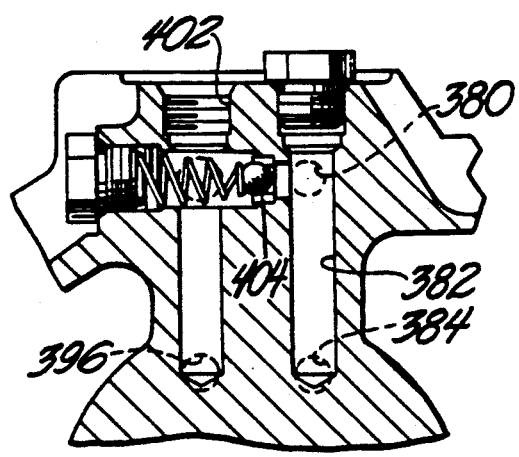
FIG. 6 is an enlarged cross sectional view of the torque converter pressure regulator valve.

When the lubricant inlet pressure in the valve block 366 is high, the regulator valve 372 passes lubricant through passages 378 to the torque converter casing 262. The passage 378 includes passages 380, 382 and 384 in the main casing cover 42 passage 386 in the stator support 60, and an annular passage 388 between the stator support 60 and the pump drive support 256. Lubricant is heated within the torque converter casing 262 as it passes through the impeller 270, the stater 266, and the turbine 268. Lubricant exits the torque converter casing 262 through a passage 390 through the stator support 60, through an annular space 361 between the stator support and the input shaft 46, through a passage 394 in the stator support to an internal passage 396 in the main casing cover and through a passage 398 to an external cooler 400. The passage 398 is connected to the threaded bore 402 shown in FIG. 6. If the pressure of lubricant in the passage 378 to the torque converter is too high, the relief valve 404 which is mounted in the main casing cover 42 will open and direct lubricant through the passage 398 to the external cooler 400.

After lubricant is cooled in the cooler 400 it is returned through a threaded aperture 401 in the main casing 40 to lubricating passages 406. Lubricating passages 406 are internal passages in the gear casing 38 and supply lubricant to the tapered roller bearings 148, 50, and 150. Lubricant from the tapered roller bearing 50 passes through passages 408 in the input shaft 46 to lubricate the needle bearing 102, the clutch disk assemblies 112 and the clutch disks 114. After passing through the needle bearing 102 and the clutch disk assemblies 112 and the clutch disks 114, the lubricant lubricates the gears and thrust washers in the transmission. Lubricant supplied to the tapered roller bearing 150 enters passages 410 in the lay shaft 146. The passge 410 supplies lubricant to the clutch disks 214, the clutch disk assemblies 212, the needle bearing 202, and through passage 215 to chamber 217 to lubricate the tapered roller bearing 148. After lubricant lubricates the needle bearing 202 the tapered roller bearing 148, the clutch disk assemblies 212 and the clutch disks 214 which form a clutch pack, it lubricates the gear and thrust washers in the gear case 38. Luricant in annular space 361 between the input shaft 46 and a bore through the stator support 60 passes through the bushing 328 to lubricate the front tapered roller bearing 48. A seal 407 between the stationary stator support 60 and the pump drive support 256 and a seal 409 adjacent to the needle bearing 250 permit some lubricant to leak from the annular space 392 between the stator support and the pump drive support and lubricate the needle bearing and the needle thrust bearing 254. Lubricant which leaks past the seals 407 and 409 is retained in a pocket 411 between the main casing cove 42 and the torque converter housing 44. The pump drive gear 248 throws lubricant from the pocket 411 to lubricate the driven pump gear 290, the front ball bearing 282 and the rear ball bearing 284 that support the pump drive shaft 280.

Lubricant from the external filter 326 is also supplied to the solenoid valves 412 and 414 by passage 416. Lubricant from the external filter 326 is further supplied to the inching valve 370 by passage 418 and to the solenoid valves 412 and 414 by passage 420.

Figure 7:
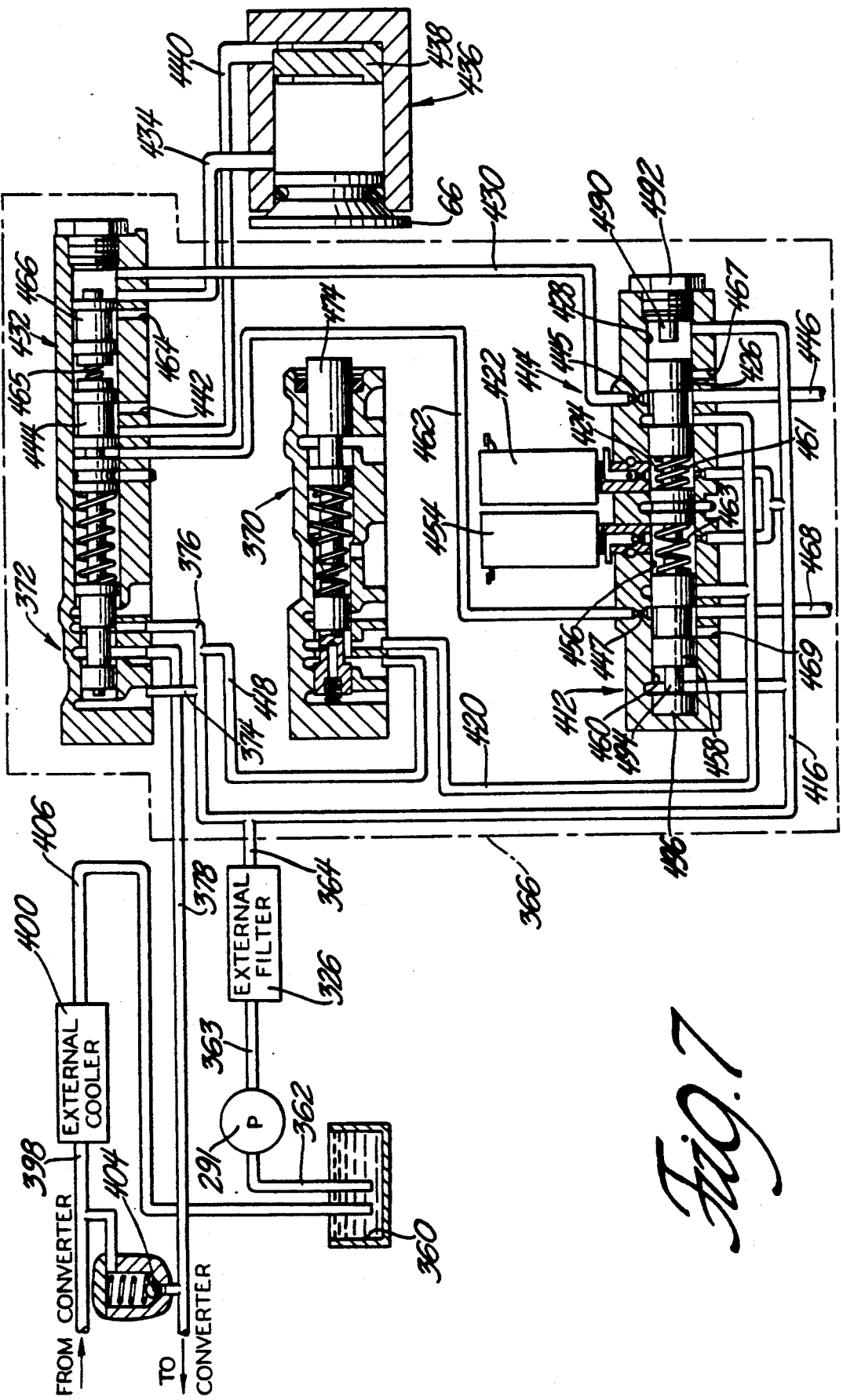
FIG. 7 is a schematic view of a portion of the control system.

When the solenoid 422 is energized as shown in FIG. 7, the pressure in the chamber 424 drops and the spool 426 is forced to the left by the pressure of lubricant in chamber 428. This allows lubricant to flow from passage 420 through passage 430 to the relief valve assembly 432 and through passage 434 to an accumulator 436. As fluid enters the accumulator 436 through passge 434 the accumulator piston 438 is moved to the right. An orifice 445 in the solenoid valve 414 meters lubricant into the passage 430 to control the rate of movement of the accumulator piston 438. Lubricant is forced out of the accumulator 436 through the passage 440 and is metered to the sump 360 through a passage 442 by a spool 444. The passage 442 can also be used to control the rate of movement of the accumulator piston 438. By metering the flow of lubricant through the orifice 445 and through passage 442 the rate of movement of the accumulator piston 438 and the rate of pressure increase in the passage 446 can be controlled. The pressure in the passage 446 increases slowly until the accumulator piston 438 reaches the end wall of the accumulator 436. After the accumulator piston 438 reaches the end of its stroke, pressure in the passage 446 increases rapidly. The passage 446 in the main casing 40 carries lubricant to an annular gallery 448 in the lay shaft 146. The annular gallery 448 is sealed by steel sealing rings 450. A passage 452 through the lay shaft 146 connects the annular galary 448 to the chamber 192. As lubricant flows into the chamber 192 the annular piston 184 compresses the return springs 198, the clutch disks 214 and the clutch disk assemblies 212 and locks the clutch gear 200 to the lay shaft 146. The accumulator 436, the orifice 445, the spool 444 and the passage 442 modulate engagement of the lay clutch on the lay shaft 146.

When the solenoid 454 is energized, the pressure in the chamber 456 drops and the spool 458 is forced to the right by pressure of fluid in the chamber 460. This allows fluid to flow from passage 420 through passage 462 to the relief valve assembly 432 and through a passage 440 to the accumulator 436. As fluid enters the accumulator through passage 440, the accumulator piston 438 is moved to the left. An orifice 447 in the solenoid valve 412 meters lubricant into the passage 462 to control the rate of movement of the accumulator piston 438. Lubricant is forced out of the accumulator 436 through the passage 434 and is metered to the sump 360 through a passage 464 by the spool 466. The passage 464 can also be used to control the rate of movement of the accumulator piston 438. By metering the flow of lubricant through the orifice 447 and through the passage 464 the rate of movement of the accumulator piston 438, the rate of pressure increase in the passage 468 can be controlled. The pressure in the passage 468 increases slowly until the accumulator piston 438 reaches the left end of the accumulator 436, as is shown in FIG. 7 and is stopped by the shaft and accumulator cover 66. After the accumulator piston 438 reaches the end of its stroke, pressure in the passage 468 increases rapidly. The passage 468 in the main casing 40 carries lubricant to an annular gallery 470 in the input shaft 46. The annular gallery 470 is sealed by steel sealing rings 472. A passage 474 through the input shaft 46 connects the annular gallery 470 to the chamber 92. As lubricant flows into the chamber 92 the annular piston 84 compresses the return springs 98, the clutch disks 114 and the clutch disk assemblies 112 and locks the clutch gear 100 to the input shaft 46. The accumulator 436, the orifice 447, the spool 466 and the passage 464 modulate engagement of the clutch on the input shaft 46.

One of the solenoids 422 or 454 can be energized at a time. Before one of the solenoids 422 or 454 can be energized, both solenoids 422 and 454 must be de-energized. When the solenoids 422 and 454 are both de-energized, the pressure in the chambers 424, 428, 456, and 460 in the solenoid valve assemblies 412 and 414 is equal. When the pressure in the chamber 424 is equal to the pressure in the chamber 428, the spool 426 will be forced to the right by the spring 461 as shown in FIG. 7. The spring 461 forces the spool 426 to the right until it contacts the fixed stop 490 on the threaded plug 492. When the pressure in the chamber 456 is equal to the pressure in the chamber 460, the spool 458 will be forced to the left by the spring 463. The spring 463 forces the spool 458 to the left until it contacts the fixed stop 494. The fixed stop 494 is part of a plug 496 that is pressed into the end of the bore for the spool 458. The spools 426 and 458 disconnect the passage 420 from the passages 430 and 462 when the solenoids 422 and 454 are de-energized and connect the annular piston hydraulic fluid chamber 192 to the sump 350 by the passage 467 and connect the annular piston hydraulic fluid chamber 92 to the sump 360 by the passage 465. The spools 444 and 466 of the relief valve assembly 432 are free to float when the passages 430 and 462 are disconnected from the lubrication pump 291. The spring 465 will then separate the spools 444 and 466 and position them in opposite ends of the bore in which they are mounted. When the spools 426 and 458 of the solenoid valve assemblies 412 and 414 are moved to the ends of the bore they are mounted in by the springs 461 and 463, passages 468 and 462 are connected to the sump 360 by the passage 469, and passages 446 and 430 are connected to the sump by the passage 467. Connecting passages 446 and 468 to sump 360 disengages the clutch packs.

The inching valve 370 has a spool 475 which is moved manually to dump lubricant from the chamber 92 or the chamber 192 thereby disengaging one of the clutches and stopping the vehicle. If it is necessary to move the vehicle a short distance lowly, such movement can be accomplished by moving the spool 475 sufficiently to repressurize the chamber 92 or the chamber 192 by reducing the rate of lubricant dumping through the inching valve 370. The inching valve 370 is operable only when one of the solenoids 422 or 454 is energized. The direction the inching valve 370 moves the vehicle when the valve is manipulated to reduce the rate of lubricant dumping depends upon which solenoid 422 or 454 is energized.

The clutch disks 114 and 214 can be thin, flat, steel members. The clutch disk assemblies 112 and 212 are steel disks with bronze facing material or some other friction material. Slipping of the clutch disks 114 relative to the clutch disk assemblies 112 or the clutch disks 214 relative to the clutch disk assemblies 212 results in wear and a decrease in the axial thickness of the disks. As the axial thickness decreases due to wear, the distance the annular pistons 84 and 184 must move to lock the clutch gears 100 and 200 to the shafts 46 and 146 increases. When the clutch disks 114 and 214 and the clutch disk assemblies 112 and 212 are worn to the point that replacement will be required within a few hours of operation, the seals 86 or 186 on the annular piston 84 or 184 will pass a passage 476 and connect the chamber 92 or 192 to the passage 478. When fluid under pressure enters the passage 478 the piston 480 is forced against a contact 482. The contact 482 activates a switch 484 which relays a warning to the operator or to maintenance personnel. This system thereby eliminates premature disassembly of the transmission 10 for replacement of clutch disks 114 or 214 and the clutch disk assemblies 112 or 212.

The torque convertor 264 drives the input shaft 46 during operation of the transmission. When the clutch gear 100 is locked to the input shaft 46 by the clutch disk assemblies 112 and the clutch disks 114, torque is transmitted from the torque converter 264, to the input shaft 46, to the clutch gear 100 to the output gear 240 and to the output shaft 36. When the clutch gear 100 is free to rotate relative to the input shaft 46, and the lay clutch gear 200 is locked to the lay shaft 146 by the clutch disks 214 and the clutch disk assemblies 212, torque is transmitted from the torque converter 246 to the input shaft 46, to the clutch cylinder and gear 78, to the clutch cylinder and gear 178, to the lay shaft 146, to the lay clutch gear 200 to the output gear 240, and to the output shaft 36.

The transmission 10 preferably employs helical gears rather than spur gears. Helical gears have a greater contact ratio, are relatively quiet and are generally capable of higher rotating speeds than spur gears. The thrust bearings described above are provided to counteract the thrust loads produced by helical gears when they are transmitting torque.

The desired gear ratio of a vehicle transmission depends upon the internal combustion engine that drives the transmission, the gear ratio of the drive axle driven by the transmission and the vehicle operating environment. The gear ratio of the forward and reverse power shift transmission 10 can be selected at the time of assembly by installing a clutch gear 100, a clutch gear 200 and an output gear 240 that provide the desired ratio. The gear ratio can also be changed by taking the transmission apart and changing the clutch gear 100, the clutch gear 200 and the output gear 240. Because the clutch gear 100, and the clutch gear 200 both mesh with the output gear 240, a change in the pitch diameter of the output gear 240 requires corresponding changes in the pitch diameter of the clutch gear 100 and the clutch gear 200. There is room within the gear case 38 to vary the pitch diameters of the clutch gear 100, the clutch gear 200 and the output gear 240 within limits. As shown in the drawing, the output gear 240 is about as large as the gear case 38 can accommodate. The pitch diameter of the output gear 240 can be decreased substantially because there is ample space available to employ a clutch gear 100 and a clutch gear 200 with increased pitch diameters. The pitch diameters of the clutch gear 100 is the same as the pitch diameter of the clutch gear 200 as shown in the drawings. This means that the forward gear ratio is the same as the reverse gear ratio.

Contamination of the lubrication system can result in contaminants being deposited in the accumulator 436. Such contamination is unusual but can occur. Contaminants inside the accumulator 436 can stick the accumulator piston 438. When the accumulator piston 438 is stuck, the accumulator 436 will not act as an accumulator and engagement of the clutch packs will not be properly modulated. Lack of modulation causes the clutch packs to engage almost instantly. Abrupt engagement of the clutch packs places extra stress on the drive train and can result in failures. By placing the accumulator piston 438 in a bore in the outside of the main casing 40 of the gear case 38 the piston 438 can be removed and cleaned merely by removing the shaft and accumulator cover 66.

The invention has been described in connection with a preferred form of the invention, but is intended to be illustrative rather than definitive thereof and the true scope of the invention is defined by the following claims.

We claim:

1. A forward and reverse power shift transmission including a gear case, an input shaft rotatably journalled in the grear case, for rotation about an input shaft axis, a gear fixed to the input shaft, a clutch gear rotatably journalled on the input shaft forward of the gear fixed to the input shaft and a clutch pack carried by the input shaft and operable to lock the clutch gear to the input shaft when engaged; a lay shaft rotatably journalled in the gear case for rotation about a lay shaft axis that is parallel to and spaced from the input shaft axis, a gear fixed to the lay shaft and in mesh with the gear fixed to the input shaft, a lay clutch gear rotatably journalled on the lay shaft forward of the gear fixed to the lay shaft and a clutch pack carried by the lay shaft and operable to lock the lay clutch gear to the lay shaft when engaged; an output shaft rotatably journalled in the gear case for rotation about an output shaft axis, an output gear secured to the output shaft and in mesh with the clutch gear on the input shaft and the lay clutch gear on the lay shaft; a pump drive gear rotatably journalled in the transmission for rotation about the input shaft axis, a pump drive shaft rotatably journalled in the gear case, and a driven pump gear secured to the pump drive shaft and in mesh with the pump drive gear; and a lubricant pump driven by the pump drive shaft and operable to supply lubricant to lubricate the transmission.

2. A forward and reverse power shift transmission as set forth in claim 1 wherein the gear case includes a torque converter housing adapted to be bolted to an internal combustion engine bell housing; and the transmission includes a torque converter that drives the input shaft and that drives the pump drive gear.

3. A forward and reverse power shift transmission as set forth in claim 1 wherein the pump drive shaft is a power takeoff shaft for driving accessories outside the transmission.

4. A forward and reverse power shift transmission as set forth in claim 1 wherein the lubricant pump supplies lubricant to a lubrication system that includes an external lubricant filter mounted on an outside surface of the gear case.

5. A forward and reverse power shift transmission as set forth in claim 4 wherein the gear case includes an integral lubricant retainer below the external lubricant filter that catches lubricant spilled during lubricant filter removal.

6. A forward and reverse power shift transmission as set forth in claim 1 wherein the transmission includes an internal brake.

7. A forward and reverse power shift transmission as set forth in claim 6 wherein the brake includes a continuous band which engages a cylindrical surface on the output shaft and an eccentric cam that tightens the band to apply the brake and loosens the band to release the brake.

8. A forward and reverse power shift transmission as set forth in claim 1 wherein the clutch pack carried by the input shaft includes a clutch wear sensor that produces a signal when a predetermined amount of clutch wear has occurred; and wherein the clutch pack carried by the lay shaft includes a clutch wear sensor that produces a signal when a predetermined amount of clutch wear has occurred.

9. A forward and reverse power shift transmission as set forth in claim 1 wherein the clutch pack carried by the input shaft includes a plurality of clutch disks and clutch disk assemblies, a piston mounted in a cylinder on the input shaft, passages for conveying lubricant to the cylinder to move the piston to engage the clutch and for conveying lubricant away from the piston to disengage the clutch and a sensor that senses when the piston moves more than a predetermined distance to engage the clutch.

10. A forward and reverse power shift transmission as set forth in claim 1 wherein the clutch pack carried by the lay shaft includes a plurality of clutch disks and clutch disk assemblies, a piston mounted in a cylinder on the lay shaft, passages for conveying lubricant to the cylinder to move the piston to engage the clutch and for conveying lubricant away from the piston to disengage the clutch and a sensor that senses when the piston moves more than a predetermined distance to engage the clutch.

11. A power shift transmission clutch pack including a gear case, a shaft with an axis journaled in the gear case, a clutch gear rotatable about the axis of said shaft, a clutch pack including a plurality of clutch disks and clutch disk assemblies and a hydraulic cylinder and piston, operable to compress the clutch disk assemblies and the clutch disks to lock the clutch gear to said shaft and to release the compression force on the clutch discs and clutch disk assemblies to allow the clutch gear to rotate relative to said shaft, and a sensor which senses the combined thickness of the clutch disks and the clutch disk assemblies when the combined thickness of the clutch disks and the clutch disk assemblies when compressed with a predetermined force is less than a predetermined distance.

12. A power shift transmission as set forth in claim 11 in which the sensor induces an aperture in the hydraulic cylinder that receives lubricant under pressure when the piston moves past a predetermined position in the cylinder thereby indicating that wear has reduced the thickness of the clutch disks and the clutch disk assemblies.

13. A power shift transmission a set forth in claim 12 wherein the aperture in the hydraulic cylinder that receives lubricant is connected to a bore with a sensor piston mounted therein operable to be moved in the bore upon the passage of compressed lubricant through the aperaure in the hydraulic cylinder and wherein the sensor piston mounted in a bore activates a sensor switch when the piston is moved by compressed lubricant that passes through the aperture in the hydraulic cylinder.

14. A power shift transmission a set forth in claim 13 wherein the clutch disks are non rotatably secured to the shaft journaled in the gear case and the clutch disk assemblies are non rotatably secured to the clutch gear.

15. A power shift transmission as set forth in claim 13 wherein the hydraulic cylinder is concentric with the shaft journaled in the gear case and the piston is annular.

16. A power shift transmission including a gear case; an input shaft journaled in the gear case; an output shaft journaled in the gear case; and a band brake including a member with a cylindrical surface mounted in the gear case, a band wrapped completely around the cylindrical surface, a yoke member attached to both ends of the band and an eccentric cam rotatably journaled in the gear case and in engagement with the yoke member and operable to move the yoke member away from the cylindrical surface to tighten the band and hold the member with the cylindrical surface from rotating and operable to move the yoke member toward the cyrlindrical surface to loosen the band and allow the member with the cylindrical surface to rotate.

17. A power shift transmission as set forth in claim 16 wherein the cylindrical surface is carried by the output shaft.

18. A power shift transmission a set forth in claim 17 wherein the band is a steel strip with an attached friction material.

19. A power shift transmission including a gear case an input shaft journaled in the gear case; an output shaft journaled in the gear case; a gear train connecting the input shaft to the output shaft, a lubrication pump mounted on the gear case, lubricant passages for conveying lubricant from the lubrication pump to shaft journals and to the gear train; a lubricant filter mounted on an outside surface of the gear case and connected to passages for conveying lubricant from the lubrication pump to shaft journals and to the gear train and a catch basin on the outside of the gear case and below the lubricant filter operable to catch oil that is released when the lubricant filter is removed.

20. A power shift transmission as set forth in claim 19 wherein the catch basin is an integral part of the gear case.

21. A forward and reverse power shift transmission including a gear case, an input shaft rotatably journalled in the gear case, for rotation about an input shaft axis, a gear fixed to the input shaft, a clutch gear rotatably journalled on the input shaft forward of the gear fixed to the input shaft and a clutch pack carried by the input shaft and operable to lock the clutch gear to the input shaft when engaged; a lay shaft rotatably journalled in the gear case for rotation about a lay shaft axis that is parallel to and spaced from the input shaft axis, a gear fixed to the lay shaft and in mesh with the gear fixed to the input shaft, a lay clutch gear rotatably journalled on the lay shaft forward of the gear fixed to the lay shaft and a clutch pack carried by the lay shaft and operable to lock the lay clutch gear to the lay shaft when engaged; an output shaft rotatably journalled in the gear case for rotation about an output shaft axis, an output gear secured to the output shaft and in mesh with the clutch gear on the input shaft and the lay clutch gear on the lay shaft; a pump drive gear rotatably journalled in the transmission for rotation about the input shaft axis, a pump drive shaft rotatably journalled in the gear case, and a driven pump gear secured to the pump drive shaft and in mesh with the pump drive gear; a lubricant pump driven by the pump drive shaft and operable to supply lubricant to lubricate the transmission; an opening in the gear case adjacent to the pump drive shaft and a torque transmission connector integral with the pump drive shaft for driving an accessory outside the gear case; a cylindrical surface on the output shaft, a band wrapped completely around the cylindrical surface, a yoke member attached to both ends of the band and an eccentric cam rotatably journaled in the gear case and in engagement with the yoke member and operable to move the yoke member away from the cylindrical surface to tighten the band and hold the output shaft from turning and operable to move the yoke member toward the cylinder surface to loosen the band and allow the output shaft to rotate; a sensor associated with one of the clutch packs which is activated when the clutch has worn a predetermined amount; a lubrication system with passages for conveying lubricant from the lubricant pump to the input shaft and the lay shaft and wherein the lubrication system includes a lubricant filter mounted on an outside surface of the gear case and a catch basin integral with the outside of the gear case and below the lubricant filter operable to catch oil that is released when the lubricant filter is removed.

22. A forward and reverse power shift transmission as set forth in claim 21 with a hydraulic control system operable to engage the clutch pack carried by the input shaft and operable to engage the clutch pack carried by the lay shaft and wherein the hydraulic control system includes an accumulator, for modulating engagement of the clutch pack with a cylindrical bore in the outside of the gear case, an accumulator piston mounted in the bore and a accumulator cover covering the cylindrical bore secured to an outside surface of the gear case that provides acess to the accumulator piston for maintenance.

23. A power shift transmission with a gear case, an input shaft, an output shaft, a gear train inside the transmission for transmitting torque from the input shaft to the output shaft, at least one hydraulically operated clutch pack operable to transmit torque from the input shaft to the output shaft when the clutch pack is engaged, and a hydraulic system for engaging the clutch pack, including an accumulator for modulating of the clutch pack, including an accumulator bore open to the outside of the gear case, an accumulator in the accumulator bore and an accumulator cover for closing the accumulator bore that provides access to the accumulator piston without opening the gear case.

* * * * *